(12) United States Patent
Wang

(10) Patent No.: US 10,996,745 B2
(45) Date of Patent: May 4, 2021

(54) METHOD AND DEVICE FOR DETERMINING GAZE POINT MAPPING FUNCTION, AND METHOD AND DEVICE FOR DETERMINING GAZE POINT

(71) Applicant: BEIJING 7INVENSUN TECHNOLOGY CO., LTD., Beijing (CN)

(72) Inventor: Yunfei Wang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 16/340,683

(22) PCT Filed: Dec. 28, 2017

(86) PCT No.: PCT/CN2017/119182
§ 371 (c)(1),
(2) Date: Apr. 9, 2019

(87) PCT Pub. No.: WO2018/121635
PCT Pub. Date: Jul. 5, 2018

(65) Prior Publication Data
US 2019/0310704 A1   Oct. 10, 2019

(30) Foreign Application Priority Data
Dec. 28, 2016   (CN) .......................... 201611231596.1

(51) Int. Cl.
*G06K 9/00*   (2006.01)
*A61B 3/14*   (2006.01)
*G06F 3/01*   (2006.01)
(52) U.S. Cl.
CPC .......... *G06F 3/013* (2013.01); *G06K 9/00597* (2013.01); *G06K 9/00604* (2013.01)

(58) Field of Classification Search
USPC ........ 382/100, 103, 106–107, 117–118, 168, 382/173, 181, 214, 254, 305, 312, 291;
(Continued)

(56) References Cited
U.S. PATENT DOCUMENTS

| 7,538,744 B1 * | 5/2009 | Liu | .......................... G06F 3/013 345/7 |
| 2004/0174496 A1 * | 9/2004 | Ji | ............................ G06F 3/013 351/209 |

(Continued)

FOREIGN PATENT DOCUMENTS

| CN | 102520796 A | 6/2012 |
| CN | 104899565 A | 9/2015 |

(Continued)

OTHER PUBLICATIONS

Jin, Chun, et al.:Estimation Method of the Fixation Point in Gaze Tracking System. Process Automation Instrumentation. vol. 37, No. 5. May 31, 2016 (May 31, 2016). p. 32-35.
(Continued)

*Primary Examiner* — Seyed H Azarian
(74) *Attorney, Agent, or Firm* — Gang Yu

(57) ABSTRACT

A method for determining a gaze point mapping function includes that: all parameters to be solved in a gaze point mapping function are combined to obtain a parameter vector of the gaze point mapping function, and the parameters to be firstly solved and parameters to be secondly solved corresponding to the parameter vector are determined; the parameters to be firstly solved for a first user are solved according to an eye image of the first user and corresponding gaze point information; solutions of the parameters to be secondly solved for the first user are determined according to the parameter vector which is solved by each of multiple second users respectively; and the gaze point mapping function of the first user is determined according to solutions of the
(Continued)

parameters to be firstly solved for the first user and the solutions of the parameters to be secondly solved for the first user.

20 Claims, 2 Drawing Sheets

(58) Field of Classification Search
USPC ...................................... 351/209, 210; 345/7
See application file for complete search history.

(56) References Cited

U.S. PATENT DOCUMENTS

| | | | | |
|---|---|---|---|---|
| 2014/0240675 A1* | 8/2014 | Narasimha-Iyer | ...... | G06F 3/013 351/210 |
| 2016/0005176 A1* | 1/2016 | Nguyen | ............. | G06K 9/00604 382/103 |
| 2016/0029883 A1* | 2/2016 | Cox | .................... | G06K 9/00604 351/209 |
| 2019/0129501 A1* | 5/2019 | Nistico | .............. | G06K 9/00604 |

FOREIGN PATENT DOCUMENTS

| | | |
|---|---|---|
| CN | 105224065 A | 1/2016 |
| CN | 105247447 A | 1/2016 |
| CN | 106066696 A | 11/2016 |
| CN | 106598258 A | 4/2017 |
| WO | 2014131690 A1 | 9/2014 |

OTHER PUBLICATIONS

Zhou, Jiabin: Study and Implementation on the Algorithm of Eye Tracking System. China Excellent Master's Thesis Full-text Database Information Technology Series. No. 10. Oct. 15, 2010(Oct. 15, 2010).

* cited by examiner

METHOD AND DEVICE FOR DETERMINING GAZE POINT MAPPING FUNCTION, AND METHOD AND DEVICE FOR DETERMINING GAZE POINT

TECHNICAL FIELD

The present disclosure relates to the technical field of human-computer interaction, and particularly to a method and device for determining a gaze point mapping function and a method and device for determining a gaze point.

BACKGROUND

Along with development of a human-computer interaction technology, a technology of controlling at least one operation of a display screen by use of an eyeball movement (called an eye-tracking technology for short) has become mature gradually. During application of this technology, when a user looks at a certain position of the display screen with eyes, an icon at the position on the display screen may be opened, closed and deleted, etc.

When the eye-tracking technology is implemented, the user is required to stare at a plurality of calibration points on the display screen for user calibration. A specific principle for the user calibration is as follows. A Virtual Reality (VR) system acquires an eye image when the user stares at each calibration point on the display screen, and determines a gaze point mapping function according to at least one image feature of each eye image and a position of a calibration point corresponding to each eye image. The role of the gaze point mapping function is to establish a mapping relationship between an eye image of the user and gaze point information of the user. After the user calibration is completed by the user and when the user uses the VR system, the VR system may calculate the gaze point information of the user according to the at least one image feature of the eye image of the user and the determined gaze point mapping function, thereby implementing the eye-tracking technology.

In the related art, the user is required to stare at M calibration points on the display screen for calibration, and the VR system solves N parameters to be solved in the gaze point mapping function according to the eye images obtained by user calibration. And a value of M is usually 9 or 16 and 2M>N. Thus it can be seen that, in the related art, the user is required to stare at multiple calibration points to determine the gaze point mapping function by use of the M calibration points, which brings a high workload to the user and is unfavorable for a user experience.

SUMMARY

At least some embodiments of the present disclosure provide a method and device for determining a gaze point mapping function and a method and device fixation for determining a gaze point, so as at least partially to solve a problem in the related art that the method for determining the gaze point mapping function by use of multiple calibration points brings a high workload to a user and is unfavorable for a user experience.

In an embodiment of the present disclosure a method for determining a gaze point mapping function, which includes that: combining all parameters to be solved in a gaze point mapping function to obtain a parameter vector of the gaze point mapping function, and determining parameters to be firstly solved and parameters to be secondly solved corresponding to the parameter vector; acquiring an eye image of a first user, and solving the parameters to be firstly solved for the first user according to the eye image and gaze point information corresponding to the eye image; determining solutions of the parameters to be secondly solved for the first user according to the parameter vector which is solved by each of a plurality of second users respectively; and determining the gaze point mapping function of the first user according to solutions of the parameters to be firstly solved for the first user and the solutions of the parameters to be secondly solved for the first user.

In an optional embodiment, determining the parameters to be firstly solved and parameters to be secondly solved corresponding to the parameter vector includes: determining a plurality of parameters sequenced at the top in the parameter vector as the parameters to be firstly solved, and determining all the other parameters, except the parameters to be firstly solved, in the parameter vector as the parameters to be secondly solved; or, performing coordinate transformation on the parameter vector, determining a plurality of parameters sequenced at the top in a parameter vector obtained by the coordinate transformation as the parameters to be firstly solved, and determining all the other parameters, except the parameters to be firstly solved, in the parameter vector obtained by coordinate transformation as the parameters to be secondly solved.

In an optional embodiment, performing the coordinate transformation on the parameter vector includes: performing principal component analysis on the parameter vector which is completely solved by each of the plurality of second users respectively; and performing the coordinate transformation on the parameter vector according to a principal component analysis result to obtain the parameter vector obtained by coordinate transformation.

In an optional embodiment, determining the solutions of the parameters to be secondly solved for the first user according to the parameter vector which is completely solved by each of the plurality of second users respectively includes: determining the solutions, corresponding to each of the plurality of second users, of the parameters to be secondly solved according to the parameter vector which is completely solved by each of the plurality of second users; and determining expected values or mean values of the solutions, corresponding to all of the plurality of second users, of the parameters to be secondly solved as the solutions of the parameters to be secondly solved for the first user.

In an optional embodiment, determining the gaze point mapping function of the first user according to the solutions of the parameters to be firstly solved for the first user and the solutions of the parameters to be secondly solved for the first user includes: determining a solution of the parameter vector of the first user according to the solutions of the parameters to be firstly solved for the first user and the solutions of the parameters to be secondly solved for the first user; and determining the gaze point mapping function of the first user according to the solution of the parameter vector of the first user.

In another embodiment of the present disclosure, a method for determining a gaze point is provided, which includes that: acquiring an eye image of a user; and determining gaze point information of the user according to at least one image feature of the eye image and a gaze point mapping function of the user, and the gaze point mapping function of the user is determined by the method in any one of above-mentioned embodiments.

In another embodiment of the present disclosure, a device for determining a gaze point mapping function is provided, which includes: a parameter determination component, configured to combine all parameters to be solved in a gaze point mapping function to obtain a parameter vector of the gaze point mapping function and determine parameters to be firstly solved and parameters to be secondly solved corresponding to the parameter vector; a first parameter solving component, configured to acquire an eye image of a first user and solve the parameters to be firstly solved for the first user according to the eye image and gaze point information corresponding to the eye image; a second parameter solving component, configured to determine solutions of the parameters to be secondly solved for the first user according to parameter vectors which is solved by each of a plurality of second users respectively; and a function determination component, configured to determine the gaze point mapping function of the first user according to solutions of the parameters to be firstly solved for the first user and the solutions of the parameters to be secondly solved for the first user.

In an optional embodiment, the parameter determination component includes: a first determination subcomponent, configured to determine a plurality of parameters sequenced at the top in the parameter vector as the parameters to be firstly solved and determine all the other parameters, except the parameters to be firstly solved, in the parameter vector as the parameters to be secondly solved; or, a second determination subcomponent, configured to perform coordinate transformation on the parameter vector, determine a plurality of parameters sequenced at the top in a parameter vector obtained by the coordinate transformation as the parameters to be firstly solved and determine all the other parameters, except the parameters to be firstly solved, in the parameter vector obtained by coordinate transformation as the parameters to be secondly solved.

In an optional embodiment, the second determination subcomponent is configured to: perform principal component analysis on the parameter vectors which have been completely solved by each of the plurality of second users respectively; and perform the coordinate transformation on the parameter vector according to a principal component analysis result to obtain the parameter vector obtained by coordinate transformation.

In an optional embodiment of the present disclosure, a device for determining a gaze point is provided, which includes: an image acquisition component, configured to acquire an eye image of a user; and an information determination component, configured to determine gaze point information of the user according to at least one image feature of the eye image and a gaze point mapping function of the user, and the gaze point mapping function of the user is determined by the device as claimed in any one of above-mentioned embodiments.

Through the method and device for determining the gaze point mapping function and the method and device for determining the gaze point provided in at least some embodiments of the present disclosure, when the gaze point mapping function of the first user is determined, a solving process for the gaze point mapping function is divided into a solving process for the parameters to be firstly solved and a solving process for the parameters to be secondly solved, the parameters to be firstly solved are solved according to the eye image of the first user and the corresponding gaze point information, and the solutions of the parameters to be secondly solved are determined according to the parameter vector which is completely solved by each of the multiple second users respectively. It is unnecessary to obtain the solutions of all the parameters in the gaze point mapping function by use of the eye image of the user, and there are no limits made to the number of eye images of the user, thus, the user is not required to stare at multiple calibration points, a workload of the user is low, and a good user experience may be provided. Therefore, the problem in the related art that determining the gaze point mapping function by use of multiple calibration points brings the high workload to the user and is unfavorable for the user experience is solved.

In order to the purpose, characteristics and advantages of the present disclosure clearer an easier to understand, detailed descriptions will be made through preferred embodiments in combination with the appended drawings.

BRIEF DESCRIPTION OF THE DRAWINGS

In order to describe technical solutions of embodiments of the present disclosure more clearly, drawings required to be used for the embodiments will be simply introduced below. It is to be understood that the following drawings illustrate some embodiments of the present disclosure and thus should not be considered as limits to the scope. Those of ordinary skill in the art may further obtain other related drawings according to these drawings without creative work.

DETAILED DESCRIPTION

Figure 1:
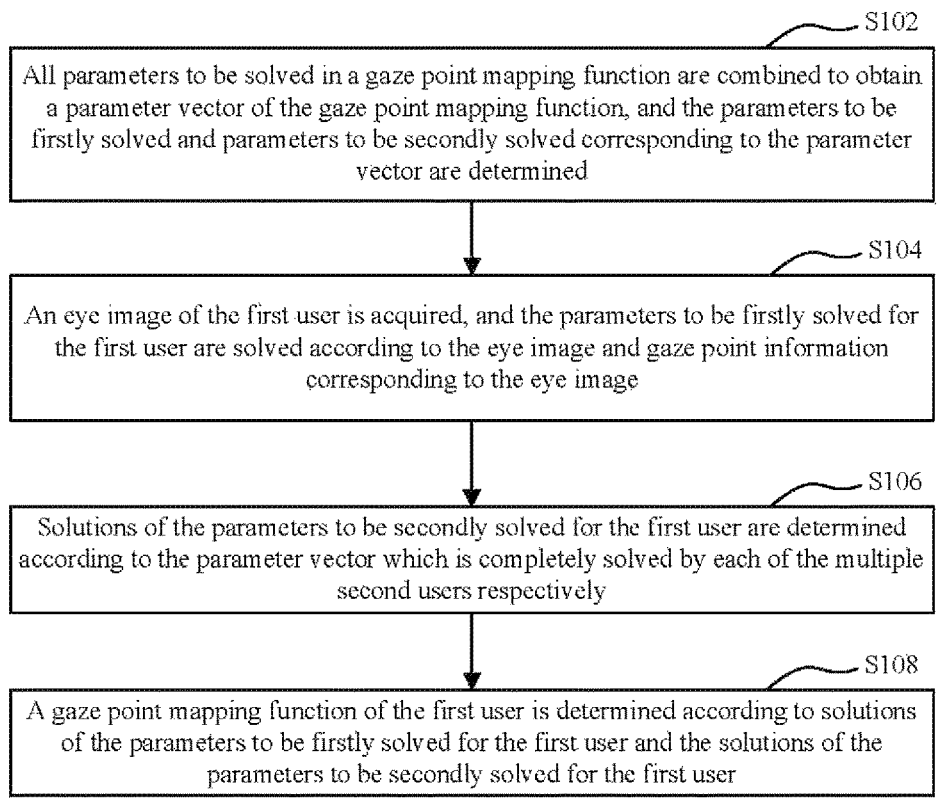
FIG. 1 is a flowchart of a method for determining a gaze point mapping function according to an embodiment of the present disclosure.

In order to make the purpose, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. Components described and illustrated in the drawings in the embodiments of the present disclosure may usually be arranged and designed with various configurations. Therefore, the following detailed descriptions about the embodiments of the present disclosure provided in the drawings are not intended to limit the scope of the claimed present disclosure but represent selected embodiments of the present disclosure. All other embodiments obtained by those skilled in the art on the basis of the embodiments of the present disclosure without creative work shall fall within the scope of protection of the present disclosure.

Considering that, in the related art, a user is required to stare at multiple calibration points which may reach 16 to determine a gaze point mapping function by use of the multiple calibration points, which brings a high workload to the user and is unfavorable for a user experience, the present disclosure provides a method and device for determining a gaze point mapping function and a method and device for determining a gaze point. Specific descriptions will be made below through the embodiments.

FIG. 1 is a flowchart of a method for determining a gaze point mapping function according to an embodiment of the present disclosure. As shown in FIG. 1, the method includes the following steps.

At step S102, all parameters to be solved in a gaze point mapping function are combined to obtain a parameter vector of the gaze point mapping function, and the parameters to be firstly solved and parameters to be secondly solved corresponding to the parameter vector are determined.

The role of the gaze point mapping function is to establish a mapping relationship between an eye image of a user and gaze point information of the user. Each user corresponds to one gaze point mapping function. After the gaze point mapping function of a certain user is determined, the gaze point information of the user may be determined according to the gaze point mapping function of the user and the eye image of the user.

Multiple parameters existed in the gaze point mapping function. For different users, the multiple parameters have different values, and the values, corresponding to different users, of each parameter are determined to determine gaze point mapping functions of different users. That is, a process of determining the gaze point mapping function of a certain user is a process of solving the value, corresponding to the user, of each parameter. Therefore, in the embodiment, the multiple parameters in the gaze point mapping function are called parameters to be solved.

All the parameters to be solved in the gaze point mapping function are combined to obtain the parameter vector of the gaze point mapping function. As discussed above, the process of determining the gaze point mapping function of a certain user is a process of solving the parameter vector corresponding to the user. Since each parameter in the parameter vector has different values for different users, each parameter in the parameter vector may also be called a user parameter.

In the embodiment, a polynomial function form, a Gaussian function form, a Three-Dimensional (3D) model function form or the like may be adopted for the gaze point mapping function. For example, the polynomial function form is adopted for the gaze point mapping function, specifically, gaze=f(x,y)=a+bx+cy+dxy+ex$^2$y . . . , and the parameter vector is X=[a, b, c, d, e . . . ]. For another example, the 3D model function form is adopted for the gaze point mapping function, specifically, gaze=g(x,y)=G(x, y, alpha, beta, R, D, n . . . ), and the parameter vector is X=[alpha, beta, R, D, n . . . ], where [alpha,beta] is a angle between line of sight and optic axis of the eye, R is a radius of a cornea curve surface, D is a distance between centers of a pupil and the cornea curve surface, and n is a refractive index of aqueous humor.

For convenient description, there is made such a hypothesis in the embodiment that the parameter vector X is an N-dimensional vector, that is, there are N parameters to be solved.

After the parameter vector is obtained, the parameters to be firstly solved and parameters to be secondly solved corresponding to the parameter vector are determined. A specific process is as follows.

At a first manner, multiple parameters sequenced at the top in the parameter vector are determined as the parameters to be firstly solved, and all the other parameters, except the parameters to be firstly solved, in the parameter vector are determined as the parameters to be secondly solved.

Specifically, the parameter vector is an N-dimensional vector. In this embodiment, the multiple parameters sequenced at the top in the N-dimensional vector are determined as the parameters to be firstly solved, and all the other parameters, except the parameters to be firstly solved, in the parameter vector are determined as the parameters to be secondly solved. Herein, it is set that the number of the parameters to be firstly solved is L and required that L<2M, and M represents the number of calibration points to be calibrated by the user on a display screen, and is usually 9 or 16. In a specific implementation mode, a value of L is determined according to an equation condition number corresponding to the gaze point mapping function.

Considering that coordinate transformation is usually required by a mathematical solving process, the parameters to be firstly solved and parameters to be secondly solved corresponding to the parameter vector may also be determined in the following manner in the embodiment.

At a second manner, the coordinate transformation is performed on the parameter vector, multiple parameters sequenced at the top in a parameter vector obtained by the coordinate transformation are determined as the parameters to be firstly solved, and all other parameters, except the parameters to be firstly solved, in the parameter vector obtained by the coordinate transformation are determined as the parameters to be secondly solved.

In this manner, the parameter vector Y obtained by the coordinate transformation and the parameter vector X are both N-dimensional vectors. That is, the number of the parameters in the parameter vector Y obtained by coordinate transformation is the same as the number of the parameters in the parameter vector X in the first manner. The number of the parameters to be firstly solved determined in this manner is consistent with the number L of the parameters to be firstly solved in the first manner, and the number of the parameters to be secondly solved determined in this manner is consistent with the number of the parameters to be secondly solved in the first manner. If the parameter vector obtained by coordinate transformation is Y=[Y1, y2, y3, y4 . . . yL . . . yN], the first L parameters in Y are determined as the parameters to be firstly solved, and the other parameters are determined as the parameters to be secondly solved.

In the second manner, a specific process of performing the coordinate transformation on the parameter vector is as follows.

At step one, principal component analysis is performed on the parameter vector which is completely solved by each of the multiple second users respectively.

Each of the multiple second users refers to a user of which a gaze point mapping function is predetermined, and each of the multiple second users corresponds to a completely solved parameter vector. At step one, the principal component analysis is performed on the parameter vector which is completely solved by each of the multiple second users respectively to obtain a principal component analysis result. If the principal component analysis result is a matrix B, the matrix B is an N N-dimensional matrix because the parameter vector is an N-dimensional vector.

At step two, the coordinate transformation is performed on the parameter vector according to the principal component analysis result to obtain the parameter vector obtained by the coordinate transformation.

The principal component analysis result is the matrix B, the parameter vector is X, the parameter vector obtained by coordinate transformation is Y, and then Y=BX.

In this embodiment, after the parameters to be firstly solved and parameters to be secondly solved corresponding to the parameter vector are determined, step S104 is executed to start determining a gaze point mapping function of a first user.

At step S104, an eye image of the first user is acquired, and the parameters to be firstly solved for the first user are solved according to the eye image and gaze point information corresponding to the eye image.

Specifically, for determining the gaze point mapping function of the first user, it is necessary to acquire the eye image of the first user. In this embodiment, the number of eye images of the first user is not limited as long as it is more than or equal to 1. After the eye image of the first user is acquired, at least one image feature, for example, a pupil coordinate and a light spot coordinate, of the eye image of the first user is extracted, and a light spot refers to an image, formed in an eyeball of the first user, of a light source.

In this embodiment, the eye image is generated when the first user stares at a gaze point on the screen. Since the gaze point on the screen is predetermined, gaze point information of the eye image of the first user may also be obtained. Therefore, in this step, the parameters to be firstly solved for the first user are solved according to the at least one image feature of the eye image of the first user and the gaze point information of the eye image of the first user. It can be understood that the parameters to be firstly solved have different solutions for different users and the parameters to be firstly solved are user parameters for different users.

Since the parameters to be firstly solved may be determined in the parameter vector and may also be determined in the parameter vector obtained by coordinate transformation, multiple implementation modes may be adopted for a specific process of solving the parameters to be firstly solved for the first user. There are no specific limits made herein.

It is to be noted that it is defined at step S102 that the number of the parameters to be firstly solved is L, L<2M and the specific value of L may be determined according to the equation condition number of the gaze point mapping function, so that, in this step, when an excessively small number of eye images are acquired and not all the parameters to be firstly solved may be solved, parameter space dimension reduction processing may be performed on the gaze point mapping function to obtain the solutions of all the parameters to be firstly solved.

At step S106, solutions of the parameters to be secondly solved for the first user are determined according to the parameter vector which is completely solved by each of the multiple second users respectively.

Each of the multiple second users refers to a user of which the gaze point mapping function is predetermined, and each of the multiple second users corresponds to a completely solved parameter vector. A specific process of determining the solutions of the parameters to be secondly solved for the first user according to the parameter vector which is completely solved by each of the multiple second users respectively may be as follows.

At step one, solutions, corresponding to each of the multiple second users, of the parameters to be secondly solved are determined according to the parameter vector which is completely solved by each of the multiple second users.

At step two, expected users or mean values of the solutions, corresponding to all of the multiple second users, of the parameters to be secondly solved are determined as the solutions of the parameters to be secondly solved for the first user.

Specifically, since each of the multiple second users corresponds to a completely solved parameter vector, for each of the multiple second users, the solutions of the parameters to be secondly solved for each of the multiple second users are known. Therefore, in this step, the expected values or mean values of the solutions, corresponding to all of the multiple second users, of the parameters to be secondly solved are determined as the solutions of the parameters to be secondly solved for the first user.

After solutions of the parameters to be firstly solved and solutions of the parameters to be secondly solved for the first user are determined, step S108 is executed.

At step S108, a gaze point mapping function of the first user is determined according to solutions of the parameters to be firstly solved for the first user and the solutions of the parameters to be secondly solved for the first user.

Since a process of determining the gaze point mapping function of the first user is a process of solving the parameter vector of the first user and the parameter vector corresponds to the parameters to be firstly solved and the parameters to be secondly solved, after the solutions of the parameters to be firstly solved and solutions of the parameters to be secondly solved for the first user are determined, the gaze point mapping function of the first user may be determined.

A specific determination process is as follows.

At step one, a solution of the parameter vector for the first user is determined according to the solutions of the parameters to be firstly solved for the first user and the solutions of the parameters to be secondly solved for the first user.

When the parameters to be firstly solved and the parameters to be secondly solved are determined in the parameter vector, the parameters to be firstly solved and the parameters to be secondly solved form the parameter vector. Therefore, the solutions of the parameters to be firstly solved for the first user and the solutions of the parameters to be secondly solved for the first user may be combined to obtain the solution of the parameter vector for the first user.

When the parameters to be firstly solved and the parameters to be secondly solved are determined in the parameter vector obtained by coordinate transformation, the parameters to be firstly solved and the parameters to be secondly solved form the parameter vector obtained by the coordinate transformation. Therefore, the solutions of the parameters to be firstly solved for the first user and the solutions of the parameters to be secondly solved for the first user may be combined to obtain a solution of the parameter vector obtained by the coordinate transformation for the first user. And inverse coordinate transformation may be performed on the solution of the parameter vector obtained by the coordinate transformation, for example, $X=B^{-1}Y$, to obtain the solution of the parameter vector for the first user.

At step two, the gaze point mapping function of the first user is determined according to the solution of the parameter vector for the first user.

After the solution of the parameter vector for the first user is determined, the solution of the parameter vector for the first user may be substituted into the gaze point mapping function to obtain the gaze point mapping function of the first user.

Through the method for determining the gaze point mapping function in the embodiment of the present disclosure, when the gaze point mapping function of the first user is determined, a solving process for the gaze point mapping function is divided into a solving process for the parameters to be firstly solved and a solving process for the parameters to be secondly solved, the parameters to be firstly solved are solved according to the eye image of the first user and the corresponding gaze point information, and the solutions of the parameters to be secondly solved are determined according to the parameter vector which is completely solved by each of the multiple second users respectively. Through the method for determining the gaze point mapping function in the embodiment, it is unnecessary to obtain the solutions of all the parameters in the gaze point mapping function by use of the eye image of the user, and there are no limits made to the number of the eye images of the user, so that the user is not required to stare at multiple calibration points, a workload of the user is low, and a good user experience may be provided. Therefore, the problem in the related art that determining the gaze point mapping function by use of multiple calibration points brings the high workload to the user and is unfavorable for the user experience is solved.

Figure 2:
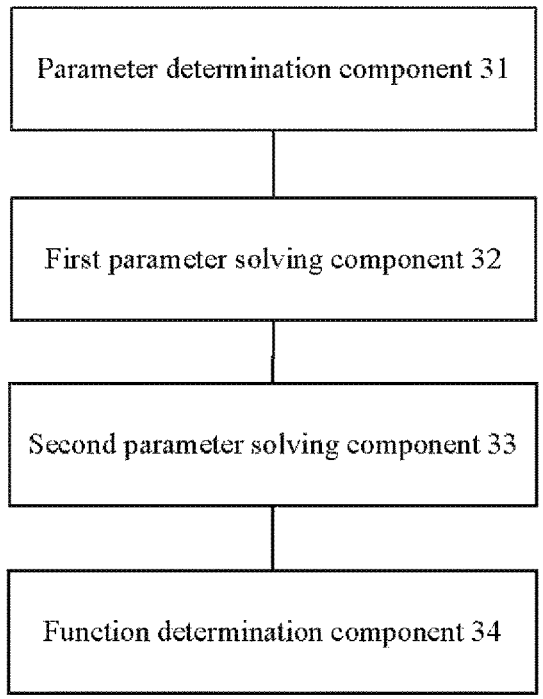
FIG. 2 is a flowchart of method for determining a gaze point according to an embodiment of the present disclosure.

On the basis of the abovementioned method for determining the gaze point mapping function, another embodiment of the present disclosure also provides a method for determining a gaze point. FIG. 2 is a flowchart of a method for determining a gaze point according to an embodiment of the present disclosure. As shown in FIG. 2, the method includes the following steps.

At step S202, an eye image of a user is acquired.

At step S204, gaze point information of the user is determined according to at least one image feature of the eye image and a gaze point mapping function of the user, and the gaze point mapping function of the user is determined by the above-mentioned method for determining the gaze point mapping function.

After the gaze point mapping function of the user is determined by the above-mentioned method for determining the gaze point mapping function, the gaze point information of the user may be determined according to the at least one image feature of the eye image of the user and the gaze point mapping function of the user. Herein, the at least one image feature of the eye image of the user may be a pupil coordinate, a light spot coordinate and the like.

In the embodiment, since the gaze point mapping function of the user is determined by the above-mentioned method for determining the gaze point mapping function, through the method for determining the gaze point in this embodiment, it is unnecessary to obtain solutions of all parameters in the gaze point mapping function by use of the eye image of the user, there are no limits made to the number of the eye images of the user, then the user is not required to stare at multiple calibration points, a workload of the user is low, and a good user experience may be provided. Therefore, the problem in the related art that determining a gaze point mapping function by use of multiple calibration points brings a high workload to the user and is unfavorable for the user experience is solved.

Figure 3:
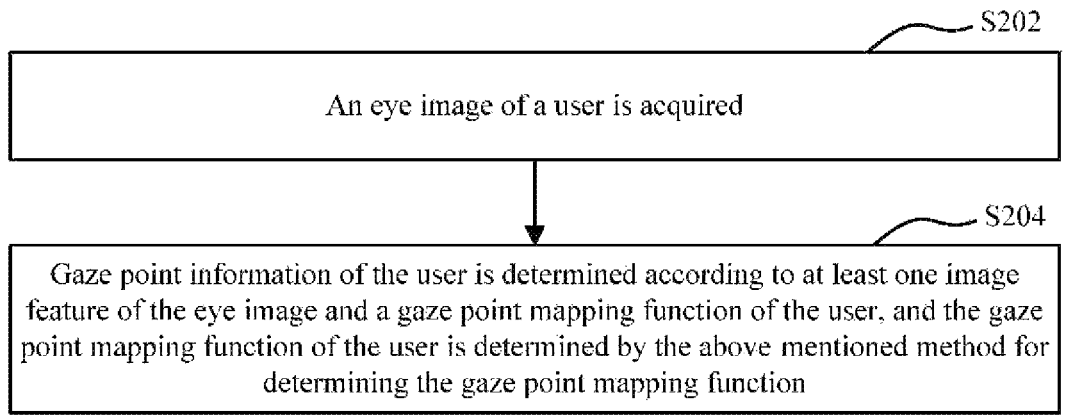
FIG. 3 is a structural block diagram of a device for determining a gaze point mapping function according to an embodiment of the present disclosure.

Corresponding to the above-mentioned method for determining the gaze point mapping function, another embodiment of the present disclosure also provides a device for determining a gaze point mapping function. FIG. 3 is a structural block diagram of a device for determining a gaze point mapping function according to an embodiment of the present disclosure. As shown in FIG. 3, the device includes:

a parameter determination component 31, configured to combine all parameters to be solved in a gaze point mapping function to obtain a parameter vector of the gaze point mapping function and determine the parameters to be firstly solved and parameters to be secondly solved corresponding to the parameter vector;

a first parameter solving component 32, configured to acquire an eye image of a first user and solve the parameters to be firstly solved for the first user according to the eye image and gaze point information corresponding to the eye image;

a second parameter solving component 33, configured to determine solutions of the parameters to be secondly solved for the first user according to parameter vector which is solved by each of multiple second users respectively; and a function determination component 34, configured to determine a gaze point mapping function of the first user according to solutions of the parameters to be firstly solved for the first user and the solutions of the parameters to be secondly solved for the first user.

The parameter determination component 31 includes: a first determination subcomponent, configured to determine multiple parameters sequenced at the top in the parameter vector as the parameters to be firstly solved and determine all the other parameters, except the parameters to be firstly solved, in the parameter vector as the parameters to be secondly solved; or, a second determination subcomponent, configured to perform coordinate transformation on the parameter vector, determine multiple parameters sequenced at the top in a parameter vector obtained by coordinate transformation as the parameters to be firstly solved and determine all the other parameters, except the parameters to be firstly solved, in the parameter vector obtained by coordinate transformation as the parameters to be secondly solved.

The second determination subcomponent is configured to perform principal component analysis on the parameter vector which is solved by each of the multiple second users respectively and perform the coordinate transformation on the parameter vector according to a principal component analysis result to obtain the parameter vector obtained by the coordinate transformation.

The second parameter solving component 33 includes: a first solving subcomponent, configured to determine the solutions, corresponding to each of the multiple second users, of the parameters to be secondly solved according to the parameter vector which is solved by each of the multiple second users; and a second solving subcomponent, configured to determine expected values or mean values of the solutions, corresponding to all of the multiple second users, of the parameters to be secondly solved as the solutions of the parameters to be secondly solved for the first user.

The function determination component 34 includes: a vector determination subcomponent, configured to determine a solution of the parameter vector of the first user according to the solutions of the parameters to be firstly solved for the first user and the solutions of the parameters to be secondly solved for the first user; and a function determination subcomponent, configured to determine the gaze point mapping function of the first user according to the solution of the parameter vector of the first user.

Through the device for determining the gaze point mapping function in this embodiment of the present disclosure, when the gaze point mapping function of the first user is determined, a solving process for the gaze point mapping function is divided into a solving process for the parameters to be firstly solved and a solving process for the parameters to be secondly solved, the parameters to be firstly solved are solved according to the eye image of the first user and the corresponding gaze point information, and the solutions of the parameters to be secondly solved are determined according to the parameter vector which is solved by each of the multiple second users respectively. Through the device for determining the gaze point mapping function in this embodiment, it is unnecessary to obtain the solutions of all the parameters in the gaze point mapping function by use of the eye image of the user, and there are no limits made to the number of the eye images of the user, so that the user is not required to stare at multiple calibration points, a workload of the user is low, and a good user experience may be provided.

Therefore, the problem in the related art that determining a gaze point mapping function by use of multiple calibration points brings a high workload to the user and is unfavorable for the user experience is solved.

Figure 4:
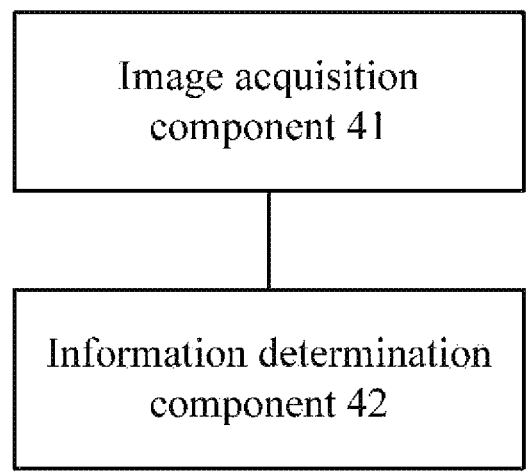
FIG. 4 is a structural block diagram of a device for determining a gaze point according to an embodiment of the present disclosure.

Corresponding to the abovementioned method for determining the gaze point, another embodiment of the present disclosure also provides a device for determining a gaze point. FIG. 4 is a structural block diagram of a device for determining a gaze point according to an embodiment of the present disclosure. As shown in FIG. 4, the device includes:

an image acquisition component 41, configured to acquire an eye image of a user; and an information determination component 42, configured to determine gaze point information of the user according to at least one image feature of the eye image and a gaze point mapping function of the user, and the gaze point mapping function of the user is determined by the above-mentioned device for determining the gaze point mapping function.

In the embodiment, since the gaze point mapping function of the user is determined by the above-mentioned device for determining the gaze point mapping function, through the device for determining the gaze point in this embodiment, it is unnecessary to obtain solutions of all parameters in the gaze point mapping function by use of the eye image of the user, there are no limits made to the number of the eye images of the user, then the user is not required to stare at multiple calibration points, a workload of the user is low, and a good user experience may be provided. Therefore, the problem in the related art that determining a gaze point mapping function by use of multiple calibration points brings a high workload to the user and is unfavorable for the user experience is solved.

The device for determining the gaze point mapping function and the device for determining the gaze point provided in at least some embodiments of the present disclosure may be specific hardware on equipment or software or firmware installed on the equipment. Implementation principles and technical effects of the devices provided in the embodiments of the present disclosure are the same as those of the method embodiments. For brief description, parts not mentioned in the device embodiments may refer to corresponding contents in the method embodiments. Those skilled in the art may clearly know that, for convenient and brief description, specific working processes of the system, devices and elements described above may refer to corresponding processes in the method embodiments and will not be elaborated herein.

In the embodiments provided in the present disclosure, it should be understood that the disclosed device and method may be implemented in another manner. The device embodiment described above is schematic. For example, division of the elements is logic function division, and other division manners may be adopted during practical implementation. For another example, multiple elements or components may be combined or integrated into another system, or some characteristics may be neglected or not executed. In addition, coupling or direct coupling or communication connection between each displayed or discussed component may be indirect coupling or communication connection, implemented through some communication interfaces, of the device or the elements, and may be electrical and mechanical or adopt other forms.

The elements described as separate parts may or may not be physically separated, and parts displayed as elements may or may not be physical elements, and namely may be located in the same place or may also be distributed to multiple network elements. Part or all of the elements may be selected to achieve the purpose of the solutions of the embodiments according to a practical requirement.

In addition, each function element in the embodiments provided in the present disclosure may be integrated into a processing element, each element may also exist independently, and two or more than two elements may also be integrated into an element.

When being realized in form of software function element and sold or used as an independent product, the function may be stored in a computer-readable storage medium. Based on such an understanding, the technical solutions of the present disclosure substantially or parts making contributions to the related art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The storage medium includes: various media capable of storing program codes such as a U disk, a mobile hard disk, a Read-Only Memory (ROM), a Random Access Memory (RAM), magnetic disk or an optical disk.

It is to be noted that similar reference signs and letters represent similar terms in the following drawings, so that a certain term, once being defined in a drawing, is not required to be further defined and explained in subsequent drawings. In addition, terms "first", "second", "third" and the like are adopted for differentiated description and should not be understood to indicate or imply relative importance.

It is finally to be noted that the above embodiments are specific implementation modes of the present disclosure adopted to not limit but describe the technical solutions of the present disclosure and not intended to limit the scope of protection of the present disclosure. Although the present disclosure is described with reference to the embodiments in detail, those of ordinary skill in the art should know that those skilled in the art may still make modifications or apparent variations to the technical solutions recorded in the embodiments or make equivalent replacements to part of technical characteristics therein within the technical scope disclosed in the present disclosure, and these modifications, variations or replacements do not make the essence of the corresponding technical solutions depart from the spirit and scope of the technical solutions of the embodiments of the present disclosure and shall also fall within the scope of protection of the present disclosure. Therefore, the scope of protection of the present disclosure should be subject to the scope of protection of the claims.

INDUSTRIAL APPLICABILITY

As described above, the method and device for determining the gaze point mapping function and the method and device for determining the gaze point provided in at least some embodiments of the present disclosure have the following beneficial effects: it is unnecessary to obtain the solutions of all the parameters in the gaze point mapping function by use of the eye image of the user, and there are no limits made to the number of the eye images of the user, so that the user is not required to stare at multiple calibration points, a workload of the user is low, and a good user experience may be provided.

What is claimed is:

1. A method for determining a gaze point mapping function, comprising:

combining all parameters to be solved in a gaze point mapping function to obtain a parameter vector of the gaze point mapping function, and determining parameters to be firstly solved and parameters to be secondly solved corresponding to the parameter vector;

acquiring an eye image of a first user, and solving the parameters to be firstly solved for the first user according to the eye image and gaze point information corresponding to the eye image;

determining solutions of the parameters to be secondly solved for the first user according to the parameter vector which is solved by each of a plurality of second users respectively, wherein each of the plurality of second users refers to a user of which a gaze point mapping function is predetermined, and each of the plurality of second users corresponds to a parameter vector having been solved; and determining the gaze point mapping function of the first user according to solutions of the parameters to be firstly solved for the first user and the solutions of the parameters to be secondly solved for the first user.

2. The method as claimed in claim 1, wherein determining the parameters to be firstly solved and parameters to be secondly solved corresponding to the parameter vector comprises:

determining a plurality of parameters sequenced at the top in the parameter vector as the parameters to be firstly solved, and determining all the other parameters, except the parameters to be firstly solved, in the parameter vector as the parameters to be secondly solved; or, performing coordinate transformation on the parameter vector, determining a plurality of parameters sequenced at the top in a parameter vector obtained by the coordinate transformation as the parameters to be firstly solved, and determining all the other parameters, except the parameters to be firstly solved, in the parameter vector obtained by coordinate transformation as the parameters to be secondly solved.

3. The method as claimed in claim 2, wherein performing the coordinate transformation on the parameter vector comprises:

performing principal component analysis on the parameter vector which is completely solved by each of the plurality of second users respectively; and performing the coordinate transformation on the parameter vector according to a principal component analysis result to obtain the parameter vector obtained by coordinate transformation.

4. The method as claimed in claim 3, wherein determining the gaze point mapping function of the first user according to the solutions of the parameters to be firstly solved for the first user and the solutions of the parameters to be secondly solved for the first user comprises:

determining a solution of the parameter vector of the first user according to the solutions of the parameters to be firstly solved for the first user and the solutions of the parameters to be secondly solved for the first user; and determining the gaze point mapping function of the first user according to the solution of the parameter vector of the first user.

5. A method for determining a gaze point, comprising:
acquiring an eye image of a user; and
determining gaze point information of the user according to at least one image feature of the eye image and a gaze point mapping function of the user, wherein the gaze point mapping function of the user is determined by the method as claimed in claim 3.

6. The method as claimed in claim 2, wherein determining the gaze point mapping function of the first user according to the solutions of the parameters to be firstly solved for the first user and the solutions of the parameters to be secondly solved for the first user comprises:

determining a solution of the parameter vector of the first user according to the solutions of the parameters to be firstly solved for the first user and the solutions of the parameters to be secondly solved for the first user; and determining the gaze point mapping function of the first user according to the solution of the parameter vector of the first user.

7. A method for determining a gaze point, comprising:
acquiring an eye image of a user; and
determining gaze point information of the user according to at least one image feature of the eye image and a gaze point mapping function of the user, wherein the gaze point mapping function of the user is determined by the method as claimed in claim 2.

8. The method as claimed in claim 1, wherein determining the solutions of the parameters to be secondly solved for the first user according to the parameter vector which is completely solved by each of the plurality of second users respectively comprises:

determining the solutions, corresponding to each of the plurality of second users, of the parameters to be secondly solved according to the parameter vector which is completely solved by each of the plurality of second users; and determining expected values or mean values of the solutions, corresponding to all of the plurality of second users, of the parameters to be secondly solved as the solutions of the parameters to be secondly solved for the first user.

9. The method as claimed in claim 8, wherein determining the gaze point mapping function of the first user according to the solutions of the parameters to be firstly solved for the first user and the solutions of the parameters to be secondly solved for the first user comprises:

determining a solution of the parameter vector of the first user according to the solutions of the parameters to be firstly solved for the first user and the solutions of the parameters to be secondly solved for the first user; and determining the gaze point mapping function of the first user according to the solution of the parameter vector of the first user.

10. A method for determining a gaze point, comprising:
acquiring an eye image of a user; and
determining gaze point information of the user according to at least one image feature of the eye image and a gaze point mapping function of the user, wherein the gaze point mapping function of the user is determined by the method as claimed in claim 8.

11. The method as claimed in claim 1, wherein determining the gaze point mapping function of the first user according to the solutions of the parameters to be firstly solved for the first user and the solutions of the parameters to be secondly solved for the first user comprises:

determining a solution of the parameter vector of the first user according to the solutions of the parameters to be firstly solved for the first user and the solutions of the parameters to be secondly solved for the first user; and determining the gaze point mapping function of the first user according to the solution of the parameter vector of the first user.

12. A method for determining a gaze point, comprising:
acquiring an eye image of a user; and
determining gaze point information of the user according to at least one image feature of the eye image and a gaze point mapping function of the user, wherein the gaze point mapping function of the user is determined by the method as claimed in claim 11.

13. A method for determining a gaze point, comprising:
acquiring an eye image of a user; and
determining gaze point information of the user according to at least one image feature of the eye image and a gaze point mapping function of the user, wherein the gaze point mapping function of the user is determined by the method as claimed in claim 1.

14. A non-transitory computer-readable medium, on which at least one computer program is stored, wherein the at least one computer program is executed by at least one processor to implement the method for determining a gaze point as claimed in claim 13.

15. A non-transitory computer-readable medium, on which at least one computer program is stored, wherein the at least one computer program is executed by at least one processor to implement the method for determining a gaze point mapping function as claimed in claim 1.

16. An electronic device, comprising:
at least one processor; and
at least one memory, configured to store at least one executable instruction of the at least one processor,
wherein the at least one processor is coupled with the at least one memory and is configured to execute the at least one executable instruction, the at least one executable instruction comprising the content as claimed in claim 1.

17. A device for determining a gaze point mapping function, comprising a hardware processor coupled with a memory and configured to execute program components stored on the memory, wherein the program components comprises:
a parameter determination component, configured to combine all parameters to be solved in a gaze point mapping function to obtain a parameter vector of the gaze point mapping function and determine parameters to be firstly solved and parameters to be secondly solved corresponding to the parameter vector;
a first parameter solving component, configured to acquire an eye image of a first user and solve the parameters to be firstly solved for the first user according to the eye image and gaze point information corresponding to the eye image;
a second parameter solving component, configured to determine solutions of the parameters to be secondly solved for the first user according to parameter vectors which is solved by each of a plurality of second users respectively, wherein each of the plurality of second users refers to a user of which a gaze point mapping function is predetermined, and each of the plurality of second users corresponds to a parameter vector having been solved; and
a function determination component, configured to determine the gaze point mapping function of the first user according to solutions of the parameters to be firstly solved for the first user and the solutions of the parameters to be secondly solved for the first user.

18. The device as claimed in claim 17, wherein the parameter determination component comprises:
a first determination subcomponent, configured to determine a plurality of parameters sequenced at the top in the parameter vector as the parameters to be firstly solved and determine all the other parameters, except the parameters to be firstly solved, in the parameter vector as the parameters to be secondly solved; or,
a second determination subcomponent, configured to perform coordinate transformation on the parameter vector, determine a plurality of parameters sequenced at the top in a parameter vector obtained by the coordinate transformation as the parameters to be firstly solved and determine all the other parameters, except the parameters to be firstly solved, in the parameter vector obtained by coordinate transformation as the parameters to be secondly solved.

19. The device as claimed in claim 18, wherein the second determination subcomponent is configured to:
perform principal component analysis on the parameter vectors which have been completely solved by each of the plurality of second users respectively; and
perform the coordinate transformation on the parameter vector according to a principal component analysis result to obtain the parameter vector obtained by coordinate transformation.

20. A device for determining a gaze point, comprising a hardware processor coupled with a memory and configured to execute program components stored on the memory, wherein the program components comprises:
an image acquisition component, configured to acquire an eye image of a user; and
an information determination component, configured to determine gaze point information of the user according to at least one image feature of the eye image and a gaze point mapping function of the user, wherein the gaze point mapping function of the user is determined by the device as claimed in claim 17.

* * * * *